(12) United States Patent
Rached

(10) Patent No.: US 9,920,961 B2
(45) Date of Patent: Mar. 20, 2018

(54) TETRAFLUOROPROPENE-BASED SUPERCRITICAL HEAT-TRANSFER FLUIDS

(75) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 224 days.

(21) Appl. No.: 14/241,301

(22) PCT Filed: Jul. 12, 2012

(86) PCT No.: PCT/FR2012/051650
§ 371 (c)(1),
(2), (4) Date: Feb. 26, 2014

(87) PCT Pub. No.: WO2013/030476
PCT Pub. Date: Mar. 7, 2013

(65) Prior Publication Data
US 2014/0223935 A1 Aug. 14, 2014

(30) Foreign Application Priority Data
Aug. 30, 2011 (FR) ..................... 11 57622

(51) Int. Cl.
*F25B 45/00* (2006.01)
*F25B 1/00* (2006.01)
(Continued)

(52) U.S. Cl.
CPC ............. *F25B 13/00* (2013.01); *C09K 5/045* (2013.01); *F25B 30/02* (2013.01);
(Continued)

(58) Field of Classification Search
CPC .................... C09K 2205/126; C09K 2205/32; C09K 5/00; C09K 5/045; F25B 13/00; F25B 30/02; F25B 2400/121
(Continued)

(56) References Cited

U.S. PATENT DOCUMENTS 6,065,305 A    5/2000 Arman et al.
6,343,486 B1   2/2002 Mizukami
(Continued)

FOREIGN PATENT DOCUMENTS

CN    1278052       12/2000
EP    1 016 836 A2   7/2000
(Continued)

OTHER PUBLICATIONS

United States of America. U.S. Department of Energy. Office of Energy Efficiency and Renewable Energy Building Technologies Office. Research and Development Roadmap for Next-Generation Low-Global Warming Potential Refrigerants. By William Goetzler, Timothy Sutherland, and Javier Burgos. N.p.: n.p., Jun. 17, 2011. Print.*

(Continued)

*Primary Examiner* — Keith Raymond
*Assistant Examiner* — Steve Tanenbaum
(74) *Attorney, Agent, or Firm* — Buchanan Ingersoll & Rooney P.C.

(57) ABSTRACT

A method for heating a fluid or a body using a vapor compression circuit containing a heat-transfer fluid containing tetrafluoropropene, said method including, successively and cyclically, evaporation of the heat-transfer fluid, compression of the heat-transfer fluid, cooling of the heat-transfer fluid and expansion of the heat-transfer fluid, the heat-transfer fluid being in the supercritical state at the end of compression. Also, an installation suited to implementing this method.

26 Claims, 1 Drawing Sheet

(51) Int. Cl.
*F25B 13/00* (2006.01)
*C09K 5/04* (2006.01)
*F25B 30/02* (2006.01)

(52) U.S. Cl.
CPC .... *C09K 2205/126* (2013.01); *C09K 2205/24* (2013.01); *F25B 2400/121* (2013.01); *Y02P 20/544* (2015.11)

(58) Field of Classification Search
USPC ........................................................ 62/77, 115
See application file for complete search history.

(56) References Cited

U.S. PATENT DOCUMENTS

| | | | |
|---|---|---|---|
| 6,814,884 B2 | 11/2004 | Jannick et al. | |
| 6,964,168 B1 | 11/2005 | Pierson et al. | |
| 2004/0256594 A1 | 12/2004 | Singh et al. | |
| 2006/0243944 A1 | 11/2006 | Minor et al. | |
| 2009/0241566 A1* | 10/2009 | Bush | F25B 9/008 62/115 |
| 2010/0044619 A1* | 2/2010 | Hulse | C09K 3/30 252/67 |
| 2010/0044620 A1* | 2/2010 | Rached | C07C 19/08 252/67 |
| 2010/0122545 A1* | 5/2010 | Minor | C08J 9/146 62/324.1 |
| 2010/0242677 A1* | 9/2010 | Luly | C07C 21/18 75/300 |
| 2011/0005244 A1* | 1/2011 | Finney | B64D 13/08 62/87 |
| 2011/0011124 A1* | 1/2011 | Matsuura | C09K 5/045 62/468 |
| 2011/0023507 A1* | 2/2011 | Yana Motta | C09K 3/30 62/115 |
| 2011/0100042 A1* | 5/2011 | Yamashita | F25B 49/005 62/228.1 |
| 2011/0146942 A1* | 6/2011 | Wittmann | F25B 40/00 165/42 |
| 2011/0240254 A1 | 10/2011 | Rached | |
| 2012/0151958 A1 | 6/2012 | Rached | |
| 2012/0255316 A1 | 10/2012 | Andre et al. | |
| 2013/0247597 A1* | 9/2013 | Kontomaris | C09K 5/045 62/77 |

FOREIGN PATENT DOCUMENTS

| | | |
|---|---|---|
| JP | 2008-544072 A | 12/2008 |
| JP | 2009-300023 A | 12/2009 |
| JP | 2011-038054 A | 2/2011 |
| JP | 2011-126523 A | 6/2011 |
| WO | WO 96/27739 A1 | 9/1996 |
| WO | WO 02/40613 A1 | 5/2002 |
| WO | WO 2005/105947 A2 | 11/2005 |
| WO | WO 2007/002625 A2 | 1/2007 |
| WO | WO 2007/131281 A1 | 11/2007 |
| WO | WO 2008/034828 A1 | 3/2008 |
| WO | WO 2009/116282 A1 | 9/2009 |
| WO | WO 2009/157320 A1 | 12/2009 |
| WO | WO 2010/059677 A2 | 5/2010 |
| WO | WO 2010/059677 A3 | 5/2010 |
| WO | 2010/061084 A | 6/2010 |
| WO | WO 2010/081990 A1 | 7/2010 |
| WO | WO 2011/015737 A1 | 2/2011 |
| WO | WO 2011/030030 A2 | 3/2011 |
| WO | WO 2011/033200 A1 | 3/2011 |
| WO | WO 2011/056824 A2 | 5/2011 |
| WO | WO 2011/073934 A1 | 6/2011 |
| WO | WO 2011/084813 A1 | 7/2011 |

OTHER PUBLICATIONS

International Search Report (PCT/ISA/210) dated Oct. 15, 2012, by the French Patent Office as the International Searching Authority for International Application No. PCT/FR2012/051650.
Tanaka et al., "Thermodynamic properties of HFO-1234yf (2,3,3,3-tetrafluoropropene)", International Journal of Refrigeration, 2010 (month unknown), pp. 474-479, vol. 33.
Extract from JP Office Action of Mar. 24, 2015 in corresponding Japanese application No. 2014527716, one page.
Notice of Reasons for Rejection issued in Japanese Patent Application No. 2016-131348, dated May 23, 2017, Japanese Patent Office, and English-language translation thereof, 14 pages.

* cited by examiner

TETRAFLUOROPROPENE-BASED SUPERCRITICAL HEAT-TRANSFER FLUIDS

TECHNICAL FIELD

The present disclosure relates to the use of tetrafluoropropene-based heat-transfer fluids in the supercritical regime, in the context of heat-pump apparatuses.

TECHNICAL BACKGROUND

Fluids based on fluorocarbon compounds are widely used in vapor compression heat-transfer systems, in particular air-conditioning, heat-pump, refrigeration or freezing devices. The common feature of these devices is that they are based on a thermodynamic cycle comprising vaporization of the fluid at low pressure (in which the fluid absorbs heat); compression of the vaporized fluid up to a high pressure; condensation of the vaporized fluid to liquid at high pressure (in which the fluid expels heat); and expansion of the fluid to complete the cycle.

The choice of a heat-transfer fluid (which may be a pure compound or a mixture of compounds) is dictated firstly by the thermodynamic properties of the fluid, and secondly by additional constraints. Thus, a particularly important criterion is that of the environmental impact of the fluid under consideration. In particular, chlorinated compounds (chlorofluorocarbons and hydrochlorofluorocarbons) have the disadvantage of damaging the ozone layer. Non-chlorinated compounds are therefore now generally preferred, such as hydrofluorocarbons, fluoro ethers and fluoro olefins.

It is also still necessary to develop other heat-transfer fluids which have a global warming potential (GWP) lower than that of the heat-transfer fluids currently used, and which exhibit equivalent or improved performance levels.

Conventionally, the heat-transfer fluid used for high-temperature heat pumps was CFC-114 (1,2-dichlorotetrafluoroethane). Another chlorinated heat-transfer fluid proposed in this application was HCFC-123 (2,2-dichloro-1,1,1-trifluoroethane).

Given the environmental constraints recalled above, various hydrofluorocarbon-based heat-transfer fluids have been proposed as a replacement for CFC-114 or HCFC-123 for high-temperature heat pumps, for example fluids containing HFC-245fa (1,1,1,3,3-pentafluoropropane) as a mixture with other compounds. In this regard, mention may be made of U.S. Pat. No. 6,814,884, WO 2010/081990, WO 2011/015737 and WO 2011/033200.

There is, however, a need to provide high-temperature heat pumps which operate with fluids which have a lower GWP and which exhibit better energy performance levels.

Moreover, it is known practice to use heat-transfer fluids in the supercritical regime.

Mention may in particular be made of document WO 2008/034828, which describes a motor vehicle air-conditioning system in which $CO_2$ is used in the supercritical regime.

Other documents use heat-transfer fluids in the supercritical regime for generating an electric current (Rankine cycles). This is the case in document WO 2007/131281, in which the compounds used are $CO_2$, n-pentane and some hydrofluorocarbons. It is also the case in document U.S. Pat. No. 6,964,168, in which the compounds used are hydrofluorocarbons or ammonia. It is additionally the case in document WO 96/27739, in which the compounds used are also hydrofluorocarbons or ammonia or else hydrochlorofluorocarbons.

Moreover, hydrofluoroolefins, in particular HFO-1234yf (2,3,3,3-tetrafluoropropene) and HFO-1234ze (1,3,3,3-tetrafluoropropene), are also known to be compounds with a low GWP, which can be used for heat-transfer applications or the like. Documents US 2004/0256594, WO 2005/105947 and WO 2007/002625 mention the use of hydrofluoroolefins in the supercritical regime for quite particular applications such as cleaning, extraction of biological substances, or deposition of catalysts.

There is therefore still a need to provide high-temperature heat pumps which operate with fluids having a lower GWP and which exhibit better energy performance levels, as emphasized above.

SUMMARY

Embodiments of the disclosure relate firstly to a process for heating a fluid or a body by means of a vapor compression circuit containing a heat-transfer fluid comprising tetrafluoropropene, said process comprising, successively and cyclically, evaporation of the heat-transfer fluid, compression of the heat-transfer fluid, cooling of the heat-transfer fluid and expansion of the heat-transfer fluid, the heat-transfer fluid being in the supercritical state at the end of compression.

According to one embodiment, the fluid or the body heated is heated at temperature of greater than or equal to 100° C., preferably greater than or equal to 110° C., more particularly greater than or equal to 120° C. and particularly preferably greater than or equal to 130° C.

According to one embodiment, during the cooling, the heat-transfer fluid exchanges heat with the fluid or body heated or with a heat-exchange fluid, and preferably the increase in temperature of the fluid or body heated or of the heat-exchange fluid, during the heat exchange, is greater than or equal to 10° C., preferably greater than or equal to 20° C., more particularly greater than or equal to 30° C. and particularly preferably greater than or equal to 40° C.

According to one embodiment, the heat-transfer fluid comprises 1,3,3,3-tetrafluoropropene or consists of 1,3,3,3-tetrafluoropropene.

According to one embodiment, the heat-transfer fluid comprises 2,3,3,3-tetrafluoropropene or consists of 2,3,3,3-tetrafluoropropene.

According to one embodiment, the heat-transfer fluid comprises at least 50% of tetrafluoropropene, preferably at least 75% and more particularly at least 90% of tetrafluoropropene.

According to one embodiment, the heat-transfer fluid also comprises one or more hydrofluorocarbons, preferably chosen from 1,1,1,2-tetrafluoroethane, difluoromethane, 1,1-difluoroethane and 1,1,1,2,2-pentafluoroethane.

According to one embodiment, the heat-transfer fluid is combined with one or more additives chosen from lubricants, stabilizers, surfactants, tracers, fluorescent agents, odorants, solubilizing agents, and mixtures thereof.

Embodiments of the disclosure relate, moreover, to a heat-pump apparatus comprising a vapor compression circuit comprising an evaporator, a compressor, an expansion valve and a cooling device, and also a heat-transfer fluid comprising tetrafluoropropene in the vapor compression circuit, the heat-transfer fluid being in the supercritical state in at least one part of the circuit.

According to one embodiment, the heat-transfer fluid comprises 1,3,3,3-tetrafluoropropene or consists of 1,3,3,3-tetrafluoropropene.

According to one embodiment, the heat-transfer fluid comprises 2,3,3,3-tetrafluoropropene or consists of 2,3,3,3-tetrafluoropropene.

According to one embodiment, the heat-transfer fluid comprises at least 50% of tetrafluoropropene, preferably at least 75% and more particularly at least 90% of tetrafluoropropene.

According to one embodiment, the heat-transfer fluid also comprises one or more hydrofluorocarbons, preferably chosen from 1,1,1,2-tetrafluoroethane, difluoromethane, 1,1-difluoroethane and 1,1,1,2,2-pentafluoroethane.

According to one embodiment, the abovementioned apparatus is suitable for heating a fluid or a body at a temperature of greater than or equal to 100° C., preferably greater than or equal to 110° C., more particularly greater than or equal to 120° C. and particularly preferably greater than or equal to 130° C.

Embodiments of the disclosure also relate to the use of tetrafluoropropene in the supercritical state for heating a fluid or a body.

According to one embodiment, the fluid or body is heated at a temperature of greater than or equal to 100° C., preferably greater than or equal to 110° C., more particularly greater than or equal to 120° C. and particularly preferably greater than or equal to 130° C.

According to one embodiment, the tetrafluoropropene is 1,3,3,3-tetrafluoropropane and/or 2,3,3,3-tetrafluoropropene.

According to one embodiment, the tetrafluoropropene is used without being combined with another heat-transfer compound.

According to one embodiment, the tetrafluoropropene is used in combination with one or more other hydrofluorocarbon heat-transfer compounds, preferably chosen from 1,1,1,2-tetrafluoroethane, difluoromethane, 1,1-difluoroethane and 1,1,1,2,2-pentafluoroethane.

Certain embodiments of the disclosure make it possible to satisfy the needs felt in the prior art. It provides more particularly high-temperature heat pumps which operate with fluids which have a lower GWP and which exhibit better energy performance levels than those of the prior art.

Certain embodiments of the disclosure provide a particularly advantageous alternative to high-temperature heat pumps which operate with CFC-114, HCFC-123 or HFC-245fa.

Certain embodiments of the disclosure make it possible in particular to obtain a lower GWP, a higher performance coefficient and a higher volumetric capacity than in the known analogous applications of the prior art.

Compared with fluids conventionally used in the supercritical regime for heat transfer, such as $CO_2$, certain embodiments of the disclosure make it possible to operate at a much lower pressure, which implies very much lower stresses on the materials used for the apparatus.

DETAILED DESCRIPTION OF EMBODIMENTS

Figure 1:
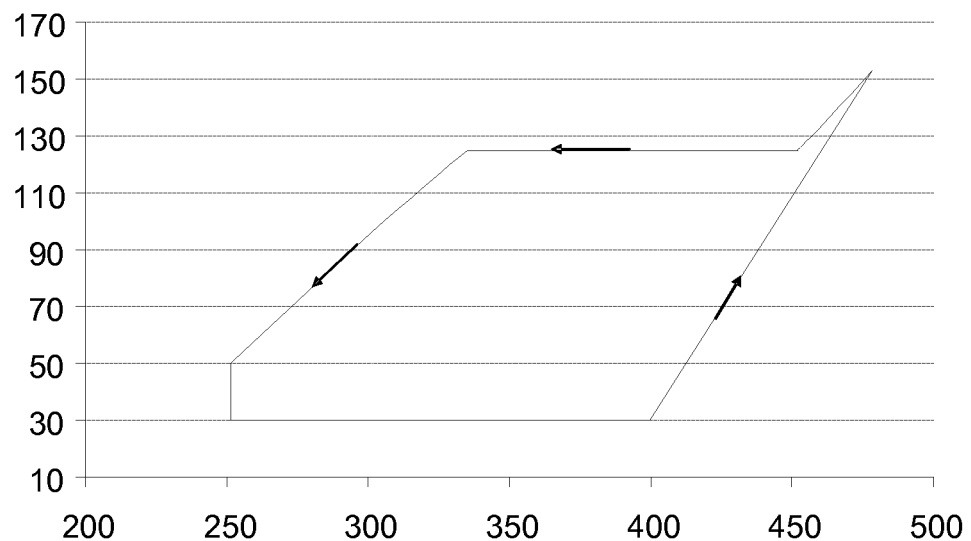
FIG. 1 represents the thermodynamic cycle of a heat pump (enthalpy in kJ/kg along the x-axis, temperature in ° C. along the y-axis) operating in the subcritical regime with HCFC-123.

Embodiments of the disclosure are now described in greater detail and in a nonlimiting manner in the description that follows.

Unless otherwise mentioned, throughout the disclosure the indicated proportions of compounds are given as weight percentages.

According to the present disclosure, the global warming potential (GWP) is defined relative to carbon dioxide and relative to a duration of 100 years, according to the method indicated in "The scientific assessment of ozone depletion, 2002, a report of the World Meteorological Association's Global Ozone Research and Monitoring Project".

The term "heat-transfer compound" or, respectively, "heat-transfer fluid" (or coolant fluid) is intended to mean a compound or, respectively, a fluid that is capable of absorbing heat by evaporating at low temperature and low pressure and of expelling heat by condensing at high temperature and high pressure, in a vapor compression circuit. In general, a heat-transfer fluid may comprise just one, two, three or more than three heat-transfer compounds.

The term "heat-transfer composition" means a composition comprising a heat-transfer fluid and optionally one or more additives that are not heat-transfer compounds for the intended application.

The additives can in particular be chosen from lubricants, stabilizers, surfactants, tracers, fluorescent agents, odorants and solubilizing agents.

The stabilizer(s), when they are present, preferably represent not more than 5% by mass in the heat-transfer composition. Among the stabilizers, mention may be made in particular of nitromethane, ascorbic acid, terephthalic acid, azoles such as tolutriazole or benzotriazole, phenolic compounds such as tocopherol, hydroquinone, t-butylhydroquinone, 2,6-di-tert-butyl-4-methylphenol, epoxides (optionally fluorinated or perfluorinated alkyl, or alkenyl or aromatic) such as n-butyl glycidyl ether, hexanediol diglycidyl ether, allyl glycidyl ether or butylphenyl glycidyl ether, phosphites, phosphonates, thiols and lactones.

By way of lubricants, use may in particular be made of oils of mineral origin, silicone oils, paraffins of natural origin, naphthenes, synthetic paraffins, alkylbenzenes, poly-alpha-olefins, polyalkene glycols, polyol esters and/or polyvinyl ethers.

As tracers (which can be detected), mention may be made of deuterated or non-deuterated hydrofluorocarbons, deuterated hydrocarbons, perfluorocarbons, fluoro ethers, bromo compounds, iodo compounds, alcohols, aldehydes, ketones, nitrous oxide and combinations thereof. The tracer is different than the heat-transfer compound(s) of which the heat-transfer fluid is composed.

Examples of solubilizers that may be mentioned include hydrocarbons, dimethyl ether, polyoxyalkylene ethers, amides, ketones, nitriles, chlorocarbons, esters, lactones, aryl ethers, fluoro ethers and 1,1,1-trifluoroalkanes. The solubilizer is different than the heat-transfer compound(s) of which the heat-transfer fluid is composed.

Fluorescent agents that may be mentioned include naphthalimides, perylenes, coumarins, anthracenes, phenanthracenes, xanthenes, thioxanthenes, naphthoxanthenes and fluoresceins, and derivatives and combinations thereof.

Odorants that may be mentioned include alkyl acrylates, allyl acrylates, acrylic acids, acrylic esters, alkyl ethers, alkyl esters, alkynes, aldehydes, thiols, thio ethers, disulfides, allylisothiocyanates, alkanoic acids, amines, norbornenes, norbornene derivatives, cyclohexene, heterocyclic aromatic compounds, ascaridole and o-methoxy(methyl) phenol, and combinations thereof.

The heat-transfer process according to an embodiment of the disclosure is based on the use of an apparatus comprising a vapor compression circuit which contains a heat-transfer composition as defined above.

The vapor compression circuit comprises at least one evaporator, a compressor, a condenser (also known as cooling device in the supercritical regime) and an expansion valve, and also lines for transporting the heat-transfer fluid between these components. The evaporator and the condenser (or cooling device) comprise a heat exchanger for exchanging heat between the heat-transfer fluid and another fluid or body.

An embodiment of the disclosure relates more specifically to a heating process. Thus, heat is yielded (directly or indirectly, via a heat-exchange fluid) from the heat-transfer fluid, during the condensation of the latter, to the fluid or body that is being heated, this taking place at a relatively high temperature relative to the environment. The apparatus for transferring heat is thus known as a "heat pump".

As compressor, use may be made in particular of a single-stage or multi-stage centrifugal compressor or a centrifugal mini-compressor. Rotary, piston or screw compressors may also be used. The compressor may be driven by an electric motor or by a gas turbine or by gears.

In the context of an embodiment of the disclosure, the heat-transfer fluids are used in the supercritical regime in the vapor compression circuit, i.e. they go through the supercritical state at least once, in particular at the end of compression/on exiting the compressor. The supercritical state is obtained when the fluid is at a temperature above its critical temperature and at a pressure above its critical pressure. A fluid in the supercritical state has intermediate physical properties between the gas state and the liquid state.

Referring to FIG. 1, a conventional cycle (subcritical, termed reverse Hirn cycle) in a vapor compression circuit for a heat pump comprises: the change of state of the heat-transfer fluid from a liquid phase (or liquid/vapor two-phase system) to a vapor phase at a relatively low pressure (evaporation), followed by compression of the fluid in the vapor phase up to a relatively high pressure, the change of state (condensation) of the heat-transfer fluid from the vapor phase to the liquid phase at a relatively high pressure, and reduction of the pressure (expansion) to recommence the cycle.

In such a cycle, the heat-transfer fluid remains at a temperature below the critical temperature and/or at a pressure below the critical pressure. The fluid is thus in the liquid state and/or in the vapor state throughout the cycle.

Figure 2:
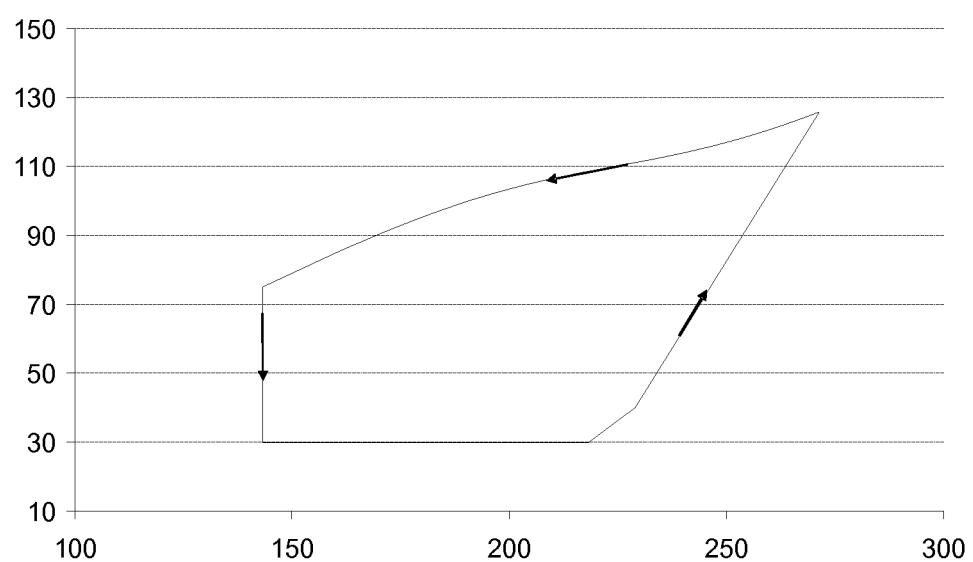
FIG. 2 represents the thermodynamic cycle of a heat pump (enthalpy in kJ/kg along the x-axis, temperature in ° C. along the y-axis) according to an embodiment of the disclosure, operating in the supercritical regime with HFO-1234yf.

Referring to FIG. 2, a supercritical cycle as used in the context of embodiments of the disclosure differs in that the heat-transfer fluid is in the supercritical (neither liquid nor vapor) state at the end of compression. It goes back into the liquid state during the cooling step in the heat exchanger known as the cooling device. At the end of the expansion and of the evaporation, the liquid moves (partially) into the gas state just as for the subcritical cycle. The fluid evaporation temperature is therefore below the critical temperature.

The apparatus according to an embodiment of the disclosure may also optionally comprise at least one heat-exchange fluid circuit used for transmitting heat (with or without a change of state) between the heat-transfer fluid circuit and the fluid or body to be heated.

The apparatus may also optionally comprise two (or more) vapor compression circuits, containing identical or different heat-transfer fluids. For example, the vapor compression circuits may be coupled together.

It is possible to use any type of heat exchanger for the implementation of the heat-transfer fluids according to embodiments of the disclosure, and in particular co-current heat exchangers or, preferably, counter-current heat exchangers.

The heat-transfer fluids used in the context of embodiments of the disclosure are compositions comprising tetrafluoropropene.

The tetrafluoropropene may be HFO-1234yf or HFO-1234ze or a mixture thereof. As regards HFO-1234ze, it may be in cis or trans form or in the form of a mixture of these two forms.

HFO-1234yf has a critical temperature of 95° C. for a critical pressure of 34 bar. HFO-1234ze has a critical temperature of 110° C. for a critical pressure of 36 bar. These compounds are therefore very suitable for use in the supercritical regime in high-temperature heat pumps.

According to one embodiment, the heat-transfer fluids used in embodiments of the disclosure may comprise one or more supplementary heat-transfer compounds.

These additional heat-transfer compounds may be chosen in particular from hydrocarbons, hydrofluorocarbons, ethers, hydrofluoro ethers and fluoro olefins.

According to particular embodiments, the heat-transfer fluids according to embodiments of the disclosure may be ternary compositions (consisting of three heat-transfer compounds) or quaternary compositions (consisting of four heat-transfer compounds), in combination with lubricant oil to form the heat-transfer compositions as defined above.

When supplementary heat-transfer compounds are present, it is preferable for their total proportion in the heat-transfer fluids above to be less than or equal to 50%, or to 45%, or to 40%, or to 35%, or to 30%, or 25%, or to 20%, or to 15%, or to 10%, or 5% or to 2%.

By way example of possible supplementary heat-transfer compounds, mention may be made of HFC-134a (1,1,1,2-tetrafluoroethane), HFC-152a (1,1-difluoroethane), HFC-125 (1,1,1,2,2-pentafluoroethane) and HFC-32 (difluoromethane). Thus, by way of the heat-transfer fluids, use may be made of mixtures (preferably in binary mixtures) of HFO-1234yf and HFC-134a; or of HFO-1234ze and HFC-134a; or of HFO-1234yf and HFC-32; or of HFO-1234ze and HFC-32; or of HFO-1234yf and HFC-152a; or of HFO-1234ze and HFC-152a; or of HFO-1234yf and HFC-125; or of HFO-1234ze and HFC-125.

In general, the critical temperature of the heat-transfer fluid under consideration should be below the desired temperature for heating the fluid or body under consideration.

However, a heat-transfer fluid critical temperature which is too low means having to work at very high pressures in order to achieve high heating temperatures, which is extremely complex to implement. For example, at a critical temperature of 31° C. (critical temperature of $CO_2$), heating a body or fluid to 100° C. means using extremely high pressures.

Consequently, the critical temperature of the heat-transfer fluid is preferably from 75 to 160° C., more particularly preferably from 90 to 120° C. and ideally from 95 to 110° C.

In the case of the binary heat-transfer fluids mentioned above, preferred formulations are the following:
from 50 to 65% of HFO-1234yf and from 35 to 50% of HFC-134a, preferably from 53 to 58% of HFO-1234yf and from 42 to 47% of HFC-134a (for example, approximately 56% of HFO-1234yf and 44% of HFC-134a);

from 15 to 90% of HFO-1234yf and from 10 to 85% of HFC-32;

from 90 to 99% of HFO-1234yf and from 1 to 10% of HFC-152a, preferably from 93 to 97% of HFO-1234yf and from 3 to 7% of HFC-152a (for example, approximately 95% of HFO-1234yf and approximately 5% of HFC-152a);

from 90 to 99% of HFO-1234yf and from 1 to 10% of HFC-125, preferably from 93 to 97% of HFO-1234yf and from 3 to 7% of HFC-125 (for example, approximately 95% of HFO-1234yf and approximately 5% of HFC-125);

from 65 to 85% of HFO-1234ze and from 15 to 35% of HFC-134a, preferably from 70 to 80% of HFO-1234ze and from 20 to 30% of HFC-134a (for example, approximately 75% of HFO-1234ze and 25% of HFC-134a);

from 80 to 98% of HFO-1234ze and from 2 to 20% of HFC-32, preferably from 85 to 95% of HFO-1234ze and from 5 to 15% of HFC-32 (for example, approximately 90% of HFO-1234ze and 10% of HFC-32);

from 90 to 99% of HFO-1234ze and from 1 to 10% of HFC-152a, preferably from 93 to 97% of HFO-1234ze and from 3 to 7% of HFC-152a (for example, approximately 95% of HFO-1234ze and approximately 5% of HFC-152a);

from 90 to 99% of HFO-1234ze and from 1 to 10% of HFC-125, preferably from 93 to 97% of HFO-1234ze and from 3 to 7% of HFC-125 (for example, approximately 95% of HFO-1234ze and approximately 5% of HFC-125).

According to another embodiment, the heat-transfer fluids consist essentially of HFO-1234yf and/or HFO-1234ze, or even consist of HFO-1234yf and/or HFO-1234ze.

Impurities may be present in such heat-transfer fluids, in a proportion of less than 1%, preferably less than 0.5%, preferably less than 0.1%, preferably less than 0.05% and preferably less than 0.01%.

According to particular embodiments, the proportion of HFO-1234yf in the heat-transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

According to particular embodiments, the proportion of HFO-1234ze in the heat-transfer fluid may be: from 0.1 to 5%; or from 5 to 10%; or from 10 to 15%; or from 15 to 20%; or from 20 to 25%; or from 25 to 30%; or from 30 to 35%; or from 35 to 40%; or from 40 to 45%; or from 45 to 50%; or from 50 to 55%; or from 55 to 60%; or from 60 to 65%; or from 65 to 70%; or from 70 to 75%; or from 75 to 80%; or from 80 to 85%; or from 85 to 90%; or from 90 to 95%; or from 95 to 99.9%.

Advantageously, the heat-transfer fluids used in the context of embodiments of the disclosure are non-inflammable within the meaning of the ASHRAE 34-2007 standard, and preferably with a test temperature of 60° C. instead of 100° C.

Embodiments of the disclosure also apply for high-temperature heating processes, i.e. preferably those in which the temperature of the fluid or of the body heated is greater than or equal to 100° C., for example greater than or equal to 110° C. or greater than or equal to 120° C. or greater than or equal to 130° C., and preferably less than or equal to 160° C.

Preferably, the maximum pressure in the vapor compression circuit is from 25 to 85 bar and preferably from 25 to 60 bar.

Embodiments of the disclosure can in particular be applied in the following fields:

heating and sterilization of food products, for example milk, preferably at a temperature of 130 to 150° C.;

production of water vapor under pressure, in particular in the chemical industry, the papermaking industry, urban heating, preferably involving heating at a temperature of 105 to 135° C.;

production of heat in the context of industrial processes by low-temperature expelled heat recovery, for example heating at a temperature of 100 to 150° C. by recovery of expelled heat at a temperature of 50 to 90° C.

According to one embodiment, the increase in the temperature of the fluid or body heated during the exchange of heat with the heat-transfer fluid (in the heat exchanger known as cooling device) is greater than or equal to 10° C., preferably greater than or equal to 20° C., more particularly greater than or equal to 30° C. and particularly preferably greater than or equal to 40° C. When the fluid or body heated does not exchange heat with the heat-transfer fluid directly, but via at least one heat-exchange fluid, the preferred increase in temperature above is understood to be the increase in temperature of the heat-exchange fluid (in the heat exchanger known as cooling device). This embodiment makes it possible to obtain maximum efficiency.

EXAMPLE

The example illustrates an embodiment of the disclosure without limiting the disclosure.

Using the data on heat-transfer compounds available in the Refrop software, an evaluation is made of the energy performance levels, respectively:

(A) of a heat pump operating in the subcritical regime (according to FIG. 1) with CFC-114, HFC-245fa or HCFC-123, for heating a thermal fluid from an initial temperature of 70° C. to a final temperature of 120° C., with low-temperature heat expulsion at 40° C.;

(B) of a heat pump operating in the supercritical regime (according to FIG. 2) with HFO-1234yf or HFO-1234ze, for heating the same thermal fluid.

The subcritical cycle (A) operates with a temperature in the evaporator of 80° C., a condensation temperature of 140° C., 10° C. of overheat, 50° C. of undercooling and an isentropic efficiency of 60%.

The supercritical cycle (B) operates with a temperature in the evaporator of 80° C., a temperature on exiting the cooling device of 90° C. (equivalent to 50° C. of undercooling), 10° C. of overheat and an isentropic efficiency of 60%.

The results obtained are given in the following table:

| Product | CET (° C.) | EVAP (bar) | PE (bar) | CR | COP | CAP (kJ/m$^3$) | % CAP |
|---|---|---|---|---|---|---|---|
| CFC-114 | 149.7 | 29.6 | 9.31 | 3.18 | 5.02 | 7999 | 100 |
| HFC-245fa | 150.8 | 28.29 | 7.89 | 3.58 | 5.04 | 7756 | 97 |
| HCFC-123 | 154.3 | 17.58 | 4.89 | 3.59 | 4.96 | 4988 | 64 |

-continued

| Product | CET (° C.) | EVAP (bar) | PE (bar) | CR | COP | CAP (kJ/m$^3$) | % CAP |
|---|---|---|---|---|---|---|---|
| HFO-1234ze | 140 | 46.8 | | 2.33 | 5.65 | 14550 | 181 |
| HFO-1234yf | 140 | 58.7 | | 2.33 | 5.13 | 16400 | 205 |

In this table, CET denotes the compressor exit temperature, EVEP denotes the expansion valve entry pressure, PE denotes the pressure in the evaporator, CR denotes the compression ratio, COP denotes the performance coefficient, CAP denotes the heating capacity per unit of mass compressed and % CAP denotes the ratio of the volumetric capacity to the reference volumetric capacity of CFC-114.

The invention claimed is:

1. A process for heating a fluid or a body by means of a vapor compression circuit containing a heat-transfer fluid consisting of: at least one compound selected from the group consisting of trans-1,3,3,3-tetrafluoropropene, and 2,3,3,3-tetrafluoropropene, and combinations thereof; and optionally one or more additives chosen from the group consisting of lubricants, stabilizers, surfactants, tracers, fluorescent agents, odorants, solubilizing agents, and mixtures thereof, said process comprising, successively and cyclically, evaporation of the heat-transfer fluid, compression of the heat-transfer fluid, cooling of the heat-transfer fluid and expansion of the heat-transfer fluid, the heat-transfer fluid being in the supercritical state at the end of compression.

2. The process as claimed in claim 1, wherein the fluid or the body heated is heated at a temperature of greater than or equal to 100° C.

3. The process as claimed in claim 1, wherein, during the cooling, the heat-transfer fluid exchanges heat with the fluid or body heated or with a heat-exchange fluid, and the increase in temperature of the fluid or body heated or of the heat-exchange fluid, during the heat exchange, is greater than or equal to 10° C.

4. The process as claimed in claim 1, wherein the heat-transfer fluid consists of trans-1,3,3,3-tetrafluoropropene and 2,3,3,3-tetrafluoropropene.

5. The process as claimed in claim 1, wherein the heat-transfer fluid comprises at least 50% by weight of tetrafluoropropene.

6. The process as claimed in claim 1, wherein the heat-transfer fluid consists of trans-1,3,3,3-tetrafluoropropene.

7. The process as claimed in claim 1, wherein the heat-transfer fluid consists of 2,3,3,3-tetrafluoropropene.

8. The process as claimed in claim 1, wherein the heat-transfer fluid comprises at least 75% by weight of tetrafluoropropene.

9. The process as claimed in claim 1, wherein the heat-transfer fluid comprises at least 90% by weight of tetrafluoropropene.

10. The process as claimed in claim 1, wherein the fluid or the body heated is heated at a temperature of greater than or equal to 120° C.

11. The process as claimed in claim 1, wherein, during the cooling, the heat-transfer fluid exchanges heat with the fluid or body heated or with a heat-exchange fluid, and the increase in temperature of the fluid or body heated or of the heat-exchange fluid, during the heat exchange, is greater than or equal to 20° C.

12. The process as claimed in claim 1, wherein the heat-transfer fluid has a critical temperature from 75° C. to 160° C.

13. A heat-pump apparatus comprising a vapor compression circuit comprising an evaporator, a compressor, an expansion valve and a condenser, and also a heat-transfer fluid consisting of: at least one compound selected from the group consisting of trans-1,3,3,3-tetrafluoropropene, and 2,3,3,3-tetrafluoropropene, and combinations thereof; and optionally one or more additives chosen from the group consisting of lubricants, stabilizers, surfactants, tracers, fluorescent agents, odorants, solubilizing agents, and mixtures thereof in the vapor compression circuit, the heat-transfer fluid being in the supercritical state in at least one part of the circuit.

14. The apparatus as claimed in claim 13, wherein the heat-transfer fluid consists of trans-1,3,3,3-tetrafluoropropene.

15. The apparatus as claimed in claim 13, wherein the heat-transfer fluid consists of 2,3,3,3-tetrafluoropropene.

16. The apparatus as claimed in claim 13, wherein the heat-transfer fluid comprises at least 50% by weight of tetrafluoropropene.

17. The apparatus as claimed in claim 13, wherein the apparatus is configured to heat a fluid or a body at a temperature of greater than or equal to 100° C.

18. The apparatus as claimed in claim 13, wherein the heat-transfer fluid comprises at least 75% by weight of tetrafluoropropene.

19. The apparatus as claimed in claim 13, wherein the heat-transfer fluid comprises at least 90% by weight of tetrafluoropropene.

20. The apparatus as claimed in claim 13, wherein the apparatus is configured to heat the heat transfer fluid to a temperature of greater than or equal to 120° C.

21. The apparatus as claimed in claim 13, wherein the heat-transfer fluid has a critical temperature from 75° C. to 160° C.

22. The apparatus as claimed in claim 13, wherein the heat-transfer fluid consists of trans-1,3,3,3-tetrafluoropropene and 2,3,3,3-tetrafluoropropene.

23. A method of heating a fluid or body, the method comprising placing tetrafluoropropene in the supercritical state for indirectly heating the fluid or the body, wherein the tetrafluoropropene is selected from the group consisting of trans-1,3,3,3-tetrafluoropropene, 2,3,3,3-tetrafluoropropene, and a combination thereof.

24. The method as claimed in claim 23, wherein the fluid or body is heated at a temperature of greater than or equal to 100° C.

25. The method as claimed in claim 23, wherein the tetrafluoropropene is used without being combined with another heat-transfer compound.

26. The method as claimed in claim 23, wherein the fluid or body is heated at a temperature of greater than or equal to 120° C.

* * * * *